United States Patent
Byun

(10) Patent No.: US 9,343,772 B2
(45) Date of Patent: May 17, 2016

(54) RECHARGEABLE BATTERY

(75) Inventor: Sang-Won Byun, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 646 days.

(21) Appl. No.: 13/207,250

(22) Filed: Aug. 10, 2011

(65) Prior Publication Data

US 2012/0088146 A1     Apr. 12, 2012

Related U.S. Application Data

(60) Provisional application No. 61/391,467, filed on Oct. 8, 2010.

(51) Int. Cl.
| | | |
|---|---|---|
| H01M 10/04 | (2006.01) | |
| H01M 10/02 | (2006.01) | |

(52) U.S. Cl.
CPC .......... *H01M 10/0431* (2013.01); *H01M 10/02* (2013.01); *H01M 10/0413* (2013.01); *H01M 10/0468* (2013.01); *H01M 10/0481* (2013.01)

(58) Field of Classification Search
CPC ............... H01M 10/0468; H01M 10/0481; H01M 2/0217
USPC ........................................................ 429/163
See application file for complete search history.

(56) References Cited

U.S. PATENT DOCUMENTS

| | | | |
|---|---|---|---|
| 2,757,222 A | 7/1956 | Andre | |
| 1,900,307 A | 3/1993 | Snyder | |
| 5,972,534 A * | 10/1999 | Pasquier | 429/144 |
| 6,083,640 A | 7/2000 | Lee et al. | |
| 6,232,015 B1 | 5/2001 | Wyser | |
| 6,572,999 B1 * | 6/2003 | Stocchiero | 429/176 |
| 7,704,637 B2 | 4/2010 | Yan et al. | |
| 2006/0051666 A1 | 3/2006 | Kim | |
| 2006/0251962 A1 | 11/2006 | Kim | |
| 2010/0151317 A1 | 6/2010 | Kim et al. | |

FOREIGN PATENT DOCUMENTS

| | | |
|---|---|---|
| CN | 100448092 C | 12/2008 |
| EP | 0 700 109 A1 | 3/1996 |
| EP | 0 948 064 A1 | 10/1999 |
| EP | 1 575 103 A2 | 9/2005 |
| FR | 871568 A | 4/1942 |
| GB | 476056 A | 12/1937 |

(Continued)

OTHER PUBLICATIONS

JPO Notice of Allowance dated Jul. 9, 2013, for corresponding Japanese Patent application 2011-219985, (3 pages).

(Continued)

*Primary Examiner* — Maria J Laios

(74) *Attorney, Agent, or Firm* — Lewis Roca Rothgerber Christie LLP

(57) ABSTRACT

A rechargeable battery includes an electrode assembly undergoing charging and discharging, a pressurization holder covering the electrode assembly and fixing the electrode assembly, a positive terminal and a negative terminal electrically connected to the electrode assembly, and a case accommodating the electrode assembly and the pressurization holder in a state in which the positive terminal and the negative terminal protrude from the case.

14 Claims, 11 Drawing Sheets

(56) References Cited

FOREIGN PATENT DOCUMENTS

| | | |
|---|---|---|
| JP | 3-28653 U | 3/1991 |
| JP | 3001823 U | 6/1994 |
| JP | 07-130393 | 5/1995 |
| JP | 9-120836 A | 5/1997 |
| JP | 10-070053 | 3/1998 |
| JP | 10-116597 | 5/1998 |
| JP | 11-329372 | 11/1999 |
| JP | 2000-090903 | 3/2000 |
| JP | 2009-099383 | 5/2009 |
| JP | 2009-533833 | 9/2009 |
| KR | 10-2000-0033228 | 6/2000 |
| KR | 10-0280720 B1 | 11/2000 |
| KR | 10-2009-0035328 A | 4/2009 |
| KR | 10-2010-0068080 | 6/2010 |

OTHER PUBLICATIONS

EPO Office action dated Jun. 6, 2013, for corresponding European Patent application 11184313.2, (4 pages).

Patent Abstracts of Japan, and English machine translation of Japanese Publication 07-130393 dated May 19, 1995, listed above, (8 pages).

Patent Abstracts of Japan, and English machine translation of Japanese Publication 10-070053 dated Mar. 10, 1998, listed above, (24 pages).

Patent Abstracts of Japan, and English machine translation of Japanese Publication 11-329372 dated Nov. 30, 1999, listed above, (8 pages).

Patent Abstracts of Japan, and English machine translation of Japanese Publication 2000-090903 listed above, (11 pages).

Patent Abstracts of Japan, and English machine translation of Japanese Publication 2009-099383 listed above, (16 pages).

Extended European Search Report dated Feb. 3, 2012 for EP Application No. 11184313.2; 8 pps.

SIPO Office action dated Dec. 23, 2013, with English translation, corresponding to Chinese Patent application 201110283327.0, (18 pages).

SIPO Office action dated Aug. 15, 2014, with English translation, for corresponding Chinese Patent application 201110283327.0, (16 pages).

Office Action dated May 15, 2014 issued by the SIPO for a corresponding Chinese Patent Application No. 201110283327 and English translation, 19 pages.

* cited by examiner

RECHARGEABLE BATTERY

CROSS-REFERENCE TO RELATED APPLICATIONS

This application claims the benefit of U.S. Provisional Application No. 61/391,467, filed on Oct. 8, 2010, in the United States Patent and Trademark Office, the disclosure of which is incorporated herein in its entirety by reference.

BACKGROUND

1. Field

The present invention relates to a rechargeable battery.

2. Description of the Related Art

Unlike a primary battery that is not rechargeable, a rechargeable battery can be discharged and recharged. A small-capacity rechargeable battery is used for small portable electronic devices such as mobile phones, notebook computers, camcorders, and the like, while a large-capacity rechargeable battery is used as a motor-driving power source for a hybrid vehicle, and the like.

Recently, a high-output rechargeable battery using a non-aqueous electrolyte of high energy density has been developed, and a plurality of high-output rechargeable batteries may be connected in series to constitute a large-capacity battery module to be used for driving a motor of a device, e.g., an electric automobile or the like, that requires much power.

Also, a single large-capacity high-output rechargeable battery generally includes a plurality of rechargeable batteries connected in series, and such rechargeable batteries may have a cylindrical shape, an angular (i.e., rectangular or quadrangular) shape, a pouch-like shape, or the like.

In a typical rechargeable battery, a positive electrode and a negative electrode are generally charged by coating an active material on a base. A separator is located between the positive and negative electrodes, and are then wound and compressed to fit an angular case and housed therein.

Sometimes, however, the electrode assembly in the interior of the case expands and contracts when the rechargeable battery is charged and discharged, resulting in the active material coated on the base becoming detached or released, or degraded. In addition, when an impact from outside of the rechargeable battery is applied to the electrode assembly, the shape of the electrode assembly may be deformed, making the rechargeable battery defective.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a rechargeable battery that stably accommodates an electrode assembly within a case and effectively protects the electrode assembly against an external impact applied thereto.

In one embodiment, a secondary battery is provided including an electrode assembly; a pressurization holder generally encompassing the electrode assembly, the pressurization holder having at least one side wall having an exterior-facing surface and an interior-facing surface, wherein at least one of the exterior-facing surface and the interior facing surface has a buffer recess; and a case housing the electrode assembly and the pressurization holder.

In one embodiment, a portion of the side wall is rounded to protrude toward the electrode assembly and the portion may be arc-shaped along at least one of a longitudinal direction or a lateral direction of the side wall. Additionally, the pressurization holder may be spaced from at least one of the case or the electrode assembly at the buffer recess.

In one embodiment, the buffer recess has a substantially planar surface that is substantially parallel to one of the interior-facing surface or the exterior-facing surface. The exterior-facing surface may include a reinforcing member generally corresponding to at least a portion of the buffer recess and the reinforcing member may protrude from the buffer recess or from the exterior-facing surface. In one embodiment, a height of the reinforcing member is less than a depth of the buffer recess.

The reinforcing member may include a plurality of protrusions or may include a plurality of ribs. The ribs may be arranged to intersect each other.

The pressurization holder may include a pair of opposing side walls, and the pair of opposing side walls may be connected by a connector. The connector may be substantially perpendicular to each of the opposing side walls. The connector may be arc-shaped.

The secondary battery may further include a cap plate on the case and wherein the connector may be located adjacent a bottom of the case substantially opposite to the cap plate. The pressurization holder may include a generally elastic and flexible material. One of the exterior-facing surface and the interior facing surface may be substantially smooth. The buffer recess may generally correspond to a center of the electrode assembly or the buffer recess may extend to an edge of the at least one side wall.

According to an exemplary embodiment of the present invention, because the electrode assembly is stably fixed by using the pressurization holder within the case, although the rechargeable battery is repeatedly charged and discharged, the electrode assembly can be prevented from excessively expanding, thus improving the life span of the rechargeable battery.

According to an exemplary embodiment of the present invention, although an external impact is applied to the rechargeable battery, because the pressurization holder stably fixes the electrode assembly, the durability of the rechargeable battery can be improved.

DETAILED DESCRIPTION OF THE EMBODIMENTS

A rechargeable battery according to exemplary embodiments of the present invention will now be described in detail with reference to the accompanying drawings. However, the present invention is not limited to the exemplary embodiments disclosed hereinafter, but may be implemented in various different forms. The exemplary embodiments herein merely complete the disclosure of the present invention and fully provide explanation of the invention to the ordinarily skilled person in the art.

Figure 1:
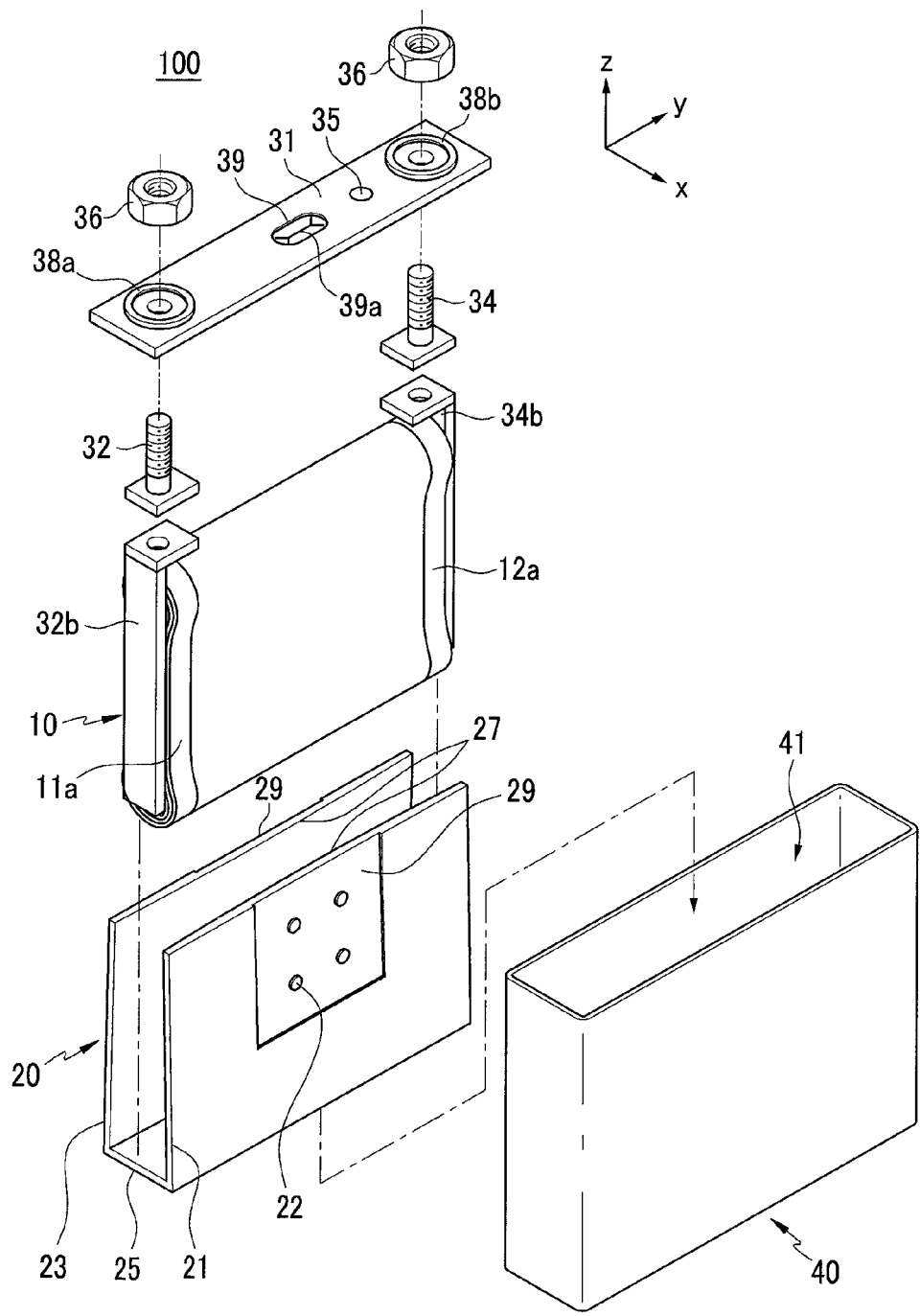
FIG. 1 is an exploded perspective view of a rechargeable battery according to a first exemplary embodiment of the present invention.
Figure 2:
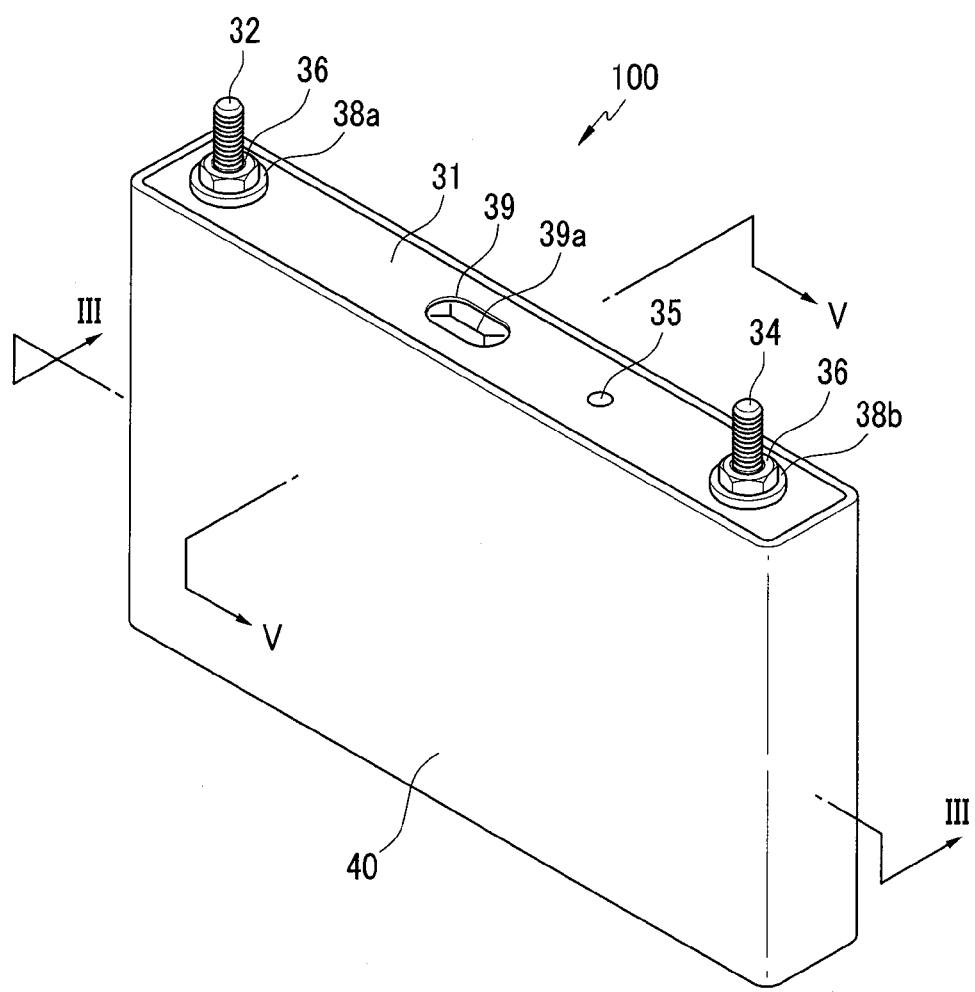
FIG. 2 is a perspective view of the rechargeable battery according to the first exemplary embodiment of the present invention.
Figure 3:
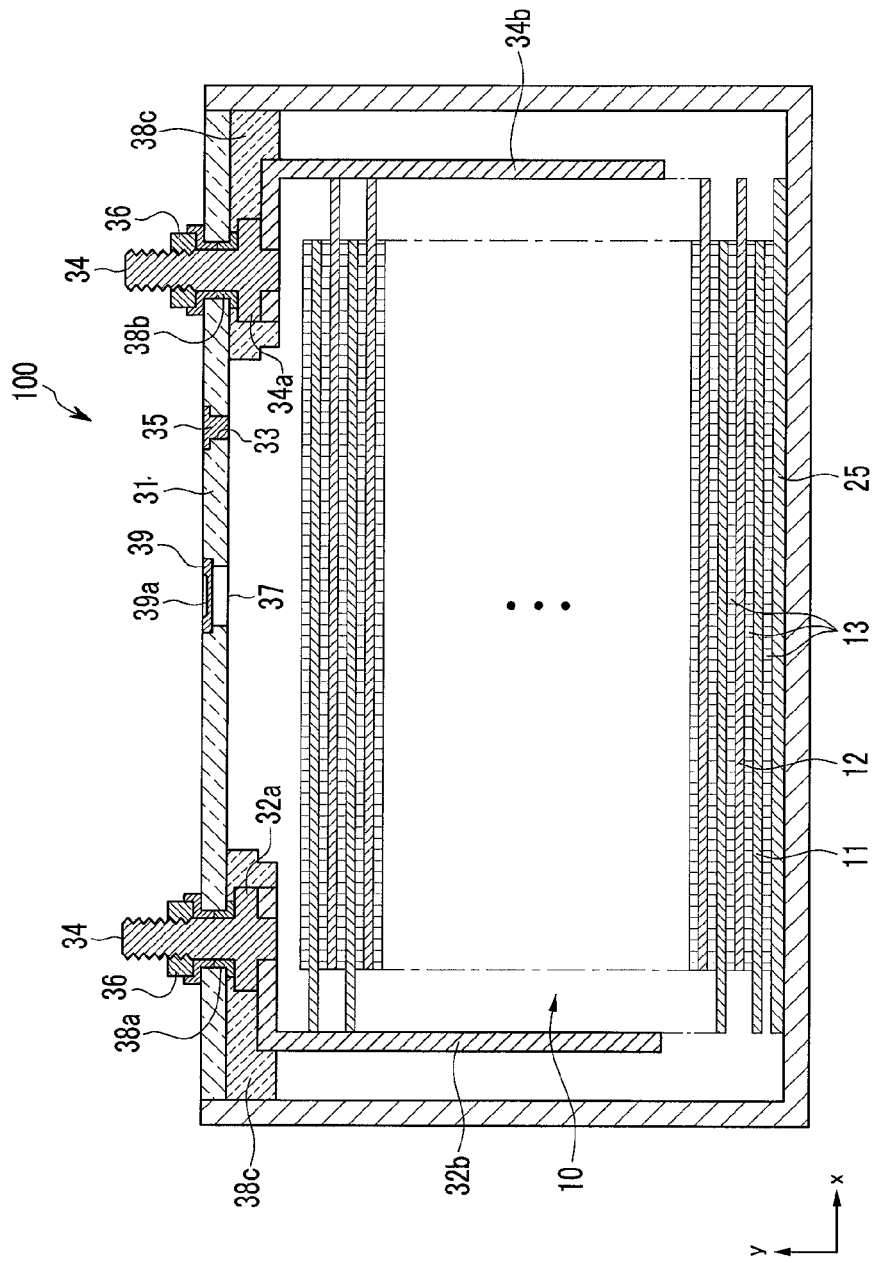
FIG. 3 is a sectional view taken along line III-III of FIG. 2.

FIG. 1 is an exploded perspective view of a rechargeable battery according to a first exemplary embodiment of the present invention, FIG. 2 is a perspective view of the rechargeable battery according to the first exemplary embodiment of the present invention, and FIG. 3 is a sectional view taken along line of FIG. 2.

As shown in FIGS. 1 to 3, a rechargeable battery 100 according to a first exemplary embodiment of the present invention includes an electrode assembly 10 that is configured to undergo a charging and discharging operation, a pressurization holder 20 fixedly covering the electrode assembly 10, terminals 32 and 34 electrically connected to the electrode assembly, and a case 40 receiving and accommodating the electrode assembly 10 in a state in which the terminals 32 and 34 protrude from the case. In one embodiment, a cap plate 31 is installed in an opening 41, and a positive terminal 32 and a negative terminal 34 are installed through openings in the cap plate 31.

A positive electrode 11 and a negative electrode 12 each include coated portions of a collector formed as a thin metal foil on which an active material is coated and uncoated portions 11a and 12a on which the active material is not coated, respectively. The positive electrode uncoated portion 11a may be formed on one side end along a lengthwise direction of the positive electrode 11, and the negative electrode uncoated portion 12a may be formed on the other side end along a lengthwise direction of the negative electrode 12.

The positive electrode 11 and the negative electrode 12 are stacked with a separator 13, which is an insulating body, located therebetween, and wound by using a winding roll or the like so as to be formed as an electrode assembly 10 in the form of a jelly roll. The electrode assembly 10 is pressurized by a press, or the like, to have a flat form, such that it can be installed in the case 40.

The case 40 has a substantially rectangular parallelepiped shape, and has the opening 41 at one side thereof.

The cap plate 31 is formed as a thin plate that is coupled to the opening 41 of the case 40. The cap plate 31 includes a sealing stopper 35 installed in an electrolyte injection hole 33, and a vent plate 39 installed in a vent hole 37 and having a notch 39a that can be opened at a pre-set pressure.

The positive terminal 32 and the negative terminal 34 are installed to penetrate the cap plate 31, and include flanges 32a and 34a formed at lower portions thereof and supported under the cap plate 31, respectively. Outer circumferential surfaces of upper columns protruded from the cap plate 31 are threaded. Nuts 36 are fastened to the positive and negative terminals 32 and 34, and support the upper portions of the positive and negative terminals 32 and 34.

In the present exemplary embodiment, the terminals 32 and 34 are illustrated to protrude in a columnar shape, but are not limited thereto, with the terminals 32 and 34 being able to have various other shapes. For example, the terminals 32 and 34 may protrude as a flat plate from an upper portion of the cap plate 31. In addition, either one of the terminals 32 and 34 may be positioned entirely within the case 40, rather than being outwardly protruded from the case 40.

A gasket 38a is installed between the positive terminal 32 and the cap plate 31. In addition, a gasket 38b is installed between the negative terminal 34 and the cap plate 31. The gaskets 38a and 38b hermetically seal portions between the terminals 32 and 34 and the cap plate 31.

The positive terminal 32 is electrically connected to the positive electrode 11 by the medium of a positive lead tab 32b, and the negative terminal 34 is electrically connected to the negative electrode 12 by the medium of a negative lead tab 34b. An insulating member 38c may be inserted between the positive terminal 32 and the positive lead tab 32b and between the negative terminal 34 and the negative lead tab 34b.

The electrode assembly 10 is inserted into the case 40 in a state in which the electrode assembly 10 is pressurized by the pressurization holder 20.

Figure 4:
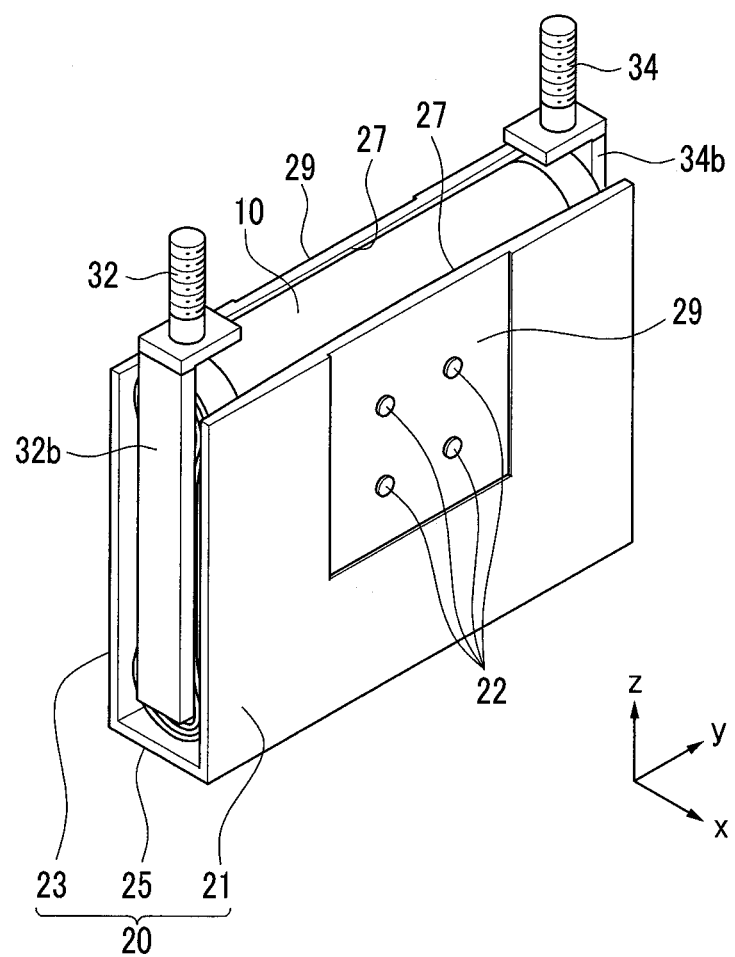
FIG. 4 is a perspective view showing a state in which an electrode assembly is in a pressurization holder.

FIG. 4 is a perspective view showing a state in which an electrode assembly is inserted into a pressurization holder.

As shown in FIG. 4, the pressurization holder 20 pressurizes both sides of the electrode assembly 10 to restrain the electrode assembly 10 from expanding in volume when the rechargeable battery 100 is charged and discharged. The pressurizing of the electrode assembly 10 by using the pressurization holder 20 is for restraining the electrode assembly 10 against expanding in volume when the rechargeable battery 100 is charged and discharged and to prevent separation or degradation of the electrode active material and deformation when an external impact is applied thereto.

In more detail, the pressurization holder 20 includes a first side wall 21 pressurizing one side (i.e., a front side) of the electrode assembly 10, a second side wall 23 pressurizing the other side (i.e., a rear side) of the electrode assembly 10, and a connection part 25 connecting the first and second side walls 21 and 23.

The first and second side walls 21 and 23 may have substantially the same area as both sides of the electrode assembly 10, and may pressurize both sides of the electrode assembly 10 together. That is, the first and second side walls 21 and 23 apply an overall uniform pressure to both sides of the electrode assembly 10 to thereby smoothly restrain the electrode assembly 10 from expanding. However, the present exemplary embodiment is not limited thereto, and the first and second side walls 21 and 23 may be smaller by a certain size than the area of both sides of the electrode assembly 10. That is, the size of the first and second side walls 21 and 23 may be configured such that a central portion of the electrode assembly 10 can be stably pressurized.

One edge of the connection part 25 is connected to the first side wall 21 and the other edge of the connection part 25 is connected to the second side wall 23. When the pressurization holder 20 is received in the case 40, the connection part 25 is positioned on the bottom of the case 40. Portions of the first and second side walls 21 and 23 may be bent to be connected to the connection part 25. That is, in the pressurization holder 20, the first and second side walls 21 and 23 and the connection part 25 are connected in a substantially channel-like shape, and the connection portions may have an angular corner shape.

The channel-like shaping of the pressurization holder 20 including the corner portions by means of the connector 25 serves to allow the corners of the connector 25 of the pressurization holder 20 to be positioned at the corners of a bottom surface of the case 40, whereby the pressurization holder 20 does not significantly wobble within the case 40 even if an external impact is applied thereto.

The first and second side walls 21 and 23 each include a rounded portion 27 formed on a face contacting the electrode assembly 10. The rounded portions 27 protrude from the first and second side walls 21 and 23 toward the electrode assembly 10 and smoothly transfer a pressurization force to the electrode assembly 10.

Figure 5A:
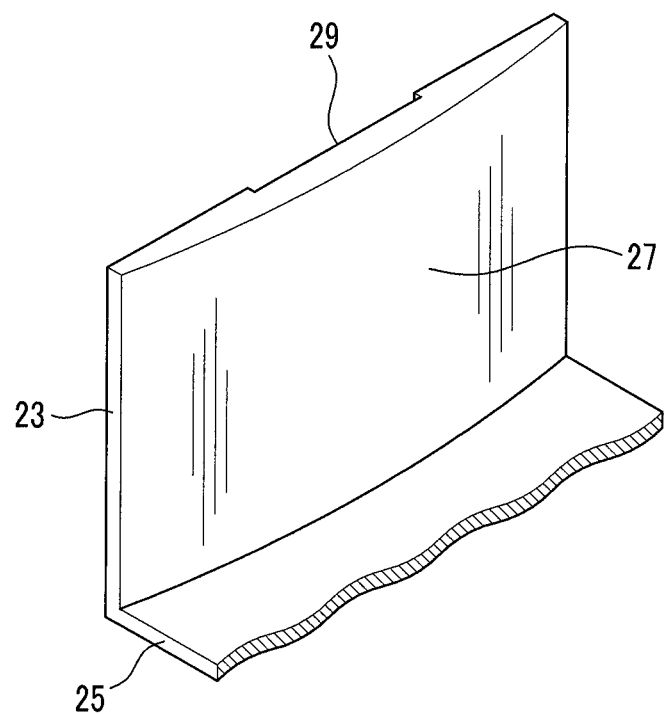
FIG. 5A is a partial perspective view showing a pressurization holder of the rechargeable battery according to the first exemplary embodiment of the present invention.
Figure 5B:
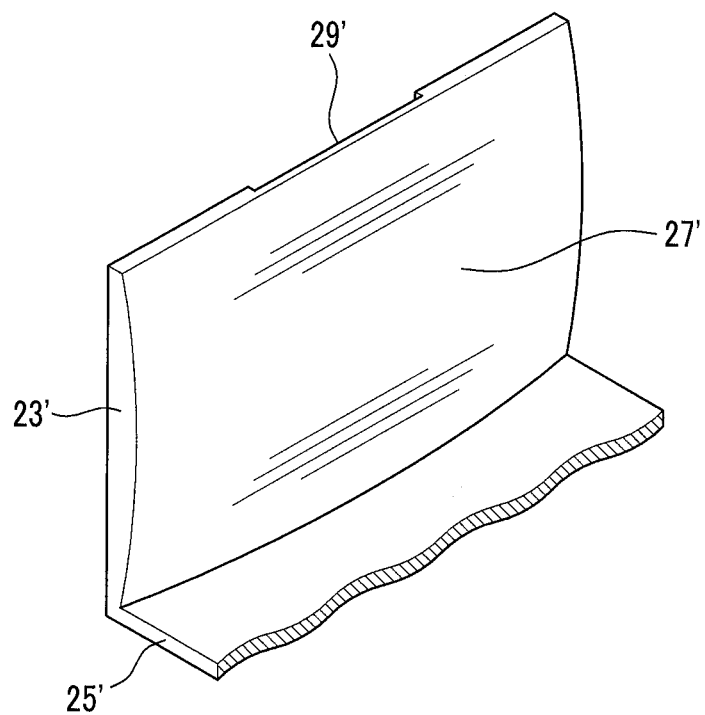
FIG. 5B is a partial perspective view showing an alternate pressurization holder of the rechargeable battery according to another exemplary embodiment of the present invention.

Referring to FIG. 5A, the rounded portion 27 of the first and second side walls 21 and 23 may have an arc-shape along a longitudinal direction thereof. In another embodiment as shown in FIG. 5B, a rounded portion 27' of the first and second side walls 23' may be arc-shaped along a lateral direction thereof. Additionally, a buffer recess 29's may be formed on a surface opposite to the rounded portion 27' or, alternatively, on the same side as the rounded portion.

The first and second side walls 21 and 23 include a buffer recess 29 on a face opposite to the rounded portion 27. The buffer recess 29 serves to prevent the first and second side walls 21 and 23 from excessively contacting an inner surface of the case 40 if the electrode assembly 10 expands when the rechargeable battery 100 is charged and discharged. This will be described in detail as follows with reference to FIGS. 6 and 7.

Figure 6:
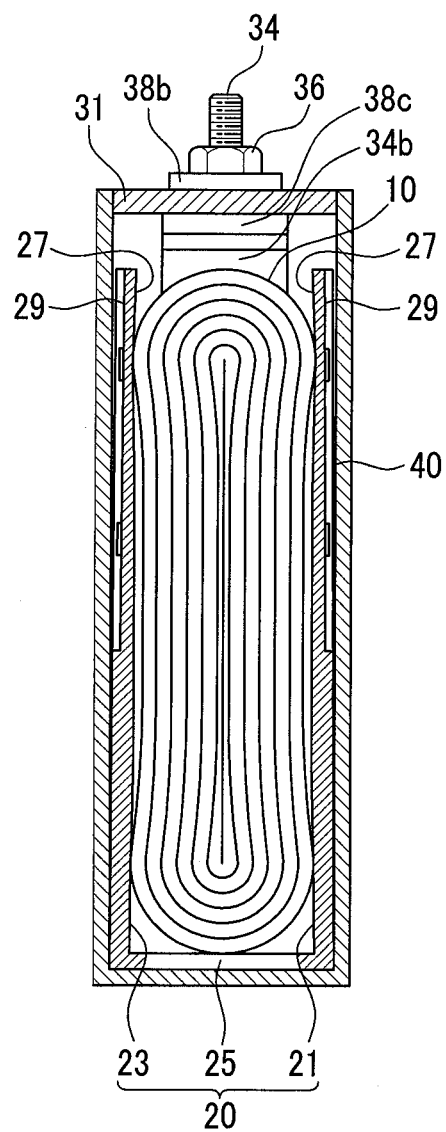
FIG. 6 is a sectional view of the rechargeable battery taken along line V-V of FIG. 2, showing that electrode assembly in an unexpanded state.
Figure 7:
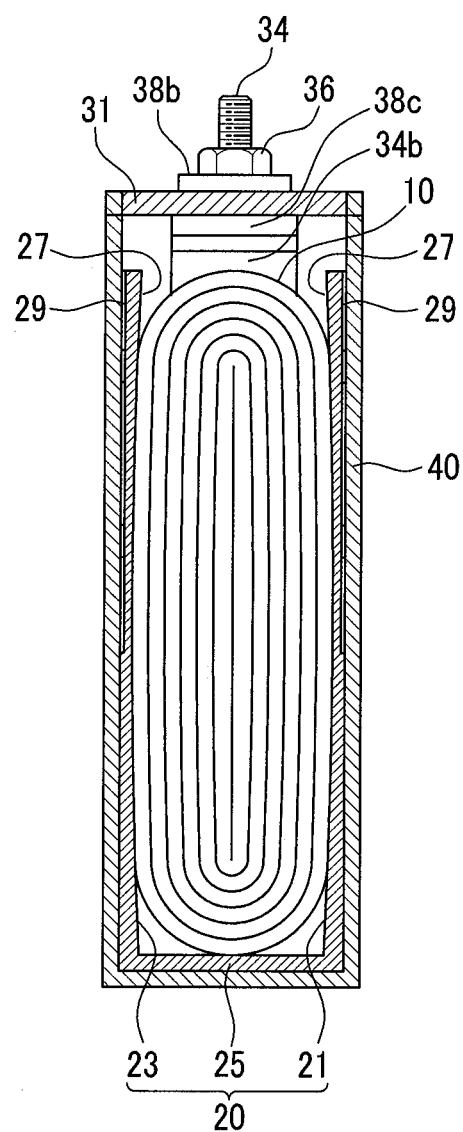
FIG. 7 is a sectional view showing a state in which the electrode assembly of FIG. 5 is expanded.

FIG. 6 is a sectional view of the rechargeable battery taken along line V-V of FIG. 2, showing the electrode assembly in an unexpanded state, and FIG. 7 is a sectional view showing a state in which the electrode assembly of FIG. 6 is expanded.

First, as shown in FIG. 6, when the electrode assembly 10 is not expanded, there may be a space between the first and second side walls 21 and 23 and an inner wall surface of the case due to the buffer recess 29.

And, as shown in FIG. 7, when the electrode assembly 10 expands toward the case 40 as the rechargeable battery 100 is charged and discharged, the first and second side walls 21 and 23 are deformed toward the case 40 due to the expansion pressure of the electrode assembly 10. In other words, the rounded portions 27 are deformed to have a nearly linear shape, while the buffer recess may be partially deformed to have a rounded shape. As such, the buffer recess 29 compensates for the deformation of the rounded portions 27, preventing some or all of the pressure from being directly applied to the case 40, thereby preventing significant deformation. In more detail, when the electrode assembly 10 expands according to charging or discharging of the rechargeable battery 100, the first and second side walls 21 and 23 may be deformed and this deformation is compensated for by the buffer recess 29. Thus, when the rechargeable battery 10 is charged and discharged, because the pressure that may cause the electrode assembly 10 to be deformed is not directly applied to the case 40, the rechargeable battery 100 is less likely to be deformed and its stability can be improved.

In one embodiment, the buffer recess 29 may include reinforcing members 22 for reinforcing the strength of the pressurization holder 20. As shown in FIG. 4, the reinforcing members 22 may be formed as a plurality of projections on the buffer recess 29. The reinforcing members 22 reinforce the strength of the side wall 21, 23 on which the buffer recess 29 is formed to thereby prevent the rounded portion 27 from being excessively deformed when the electrode assembly 10 expands. The reinforcing members 22 may protrude by less than a depth of the buffer recess 29 so that the pressurization holder 20 can be prevented from contacting the case 40 when the electrode assembly 10 expands.

The pressurization holder 20 may be made of a material such as polypropylene or polyphenylene sulfide. Thus, the pressurization holder 20 can have an elastic compressive force to thus effectively pressurize the electrode assembly 10.

Figure 8:
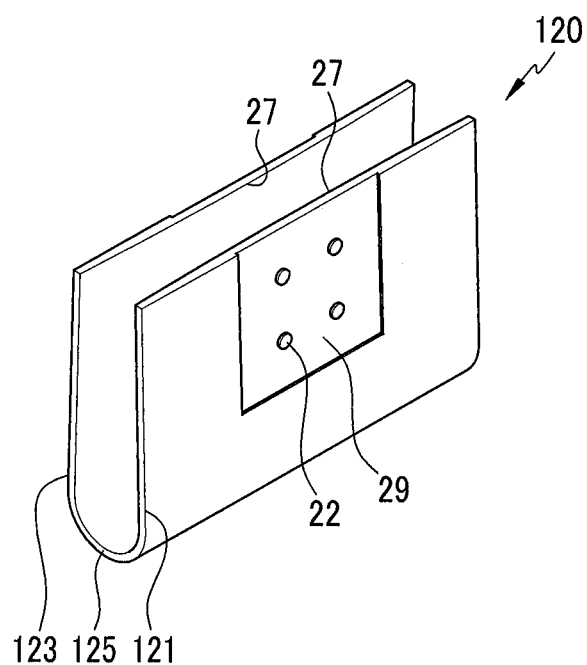
FIG. 8 is a schematic perspective view of a pressurization holder of a rechargeable battery according to a second exemplary embodiment of the present invention.

FIG. 8 is a schematic perspective view of a pressurization holder of a rechargeable battery according to a second exemplary embodiment of the present invention. The same reference numerals as those of FIGS. 1 to 7 denote the same members. Thus, a detailed description of the same reference numerals will be omitted hereinafter.

As shown in FIG. 8, a pressurization holder 120 includes a first side wall 121, a second side wall 123, and a connector 125. Here, the connector 125 connects the first and second side walls 121 and 123 such that the connection portions therebetween have a rounded shape. Further, the pressurization holder can be made as a single integral piece from a single material. Accordingly, formation of burrs at the corner portions of the pressurization holder 120 can be substantially prevented, and therefore a phenomenon in which the corner portions are broken due to stress concentrated thereto in the occurrence of an external impact can be substantially prevented.

Figure 9:
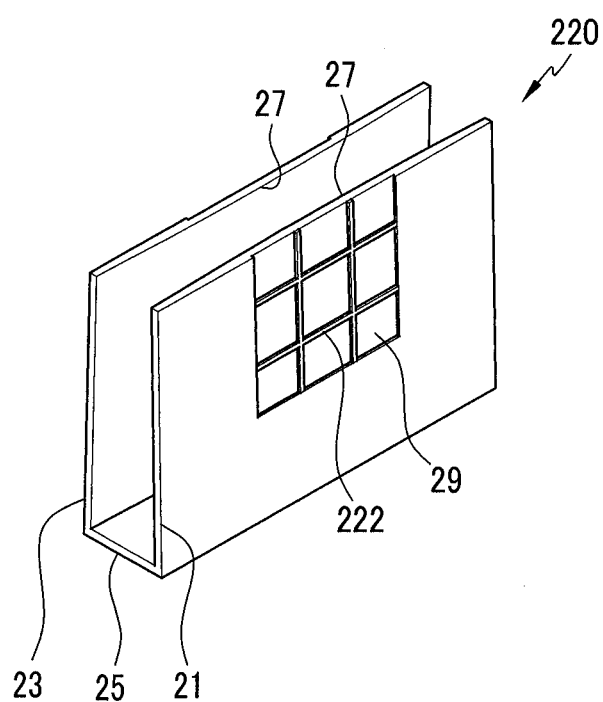
FIG. 9 is a schematic perspective view of a pressurization holder of a rechargeable battery according to a third exemplary embodiment of the present invention.

FIG. 9 is a schematic perspective view of a pressurization holder of a rechargeable battery according to a third exemplary embodiment of the present invention. The same reference numerals as those of FIGS. 1 to 8 denote the same members. Thus, a detailed description of the same reference numerals will be omitted hereinafter.

As shown in FIG. 9, a pressurization holder 220 according to the third exemplary embodiment of the present invention includes a buffer recess 29 on which a reinforcing member 222 is formed to have a rib-like shape. The height of the reinforcing member 222 in the rib-like shape according to the present exemplary embodiment is lower than a depth of the buffer recess 29. Similarly to the projections 22 described above, the reinforcing members 22 in the first exemplary embodiment, the reinforcing member 222 does not come in to significant contact with the case 40.

The rib-like shape of the reinforcing member 222 according to the third exemplary embodiment of the present invention may be a lattice shape formed on the buffer recess 29, i.e. the ribs may intersect each other.

Figure 10:
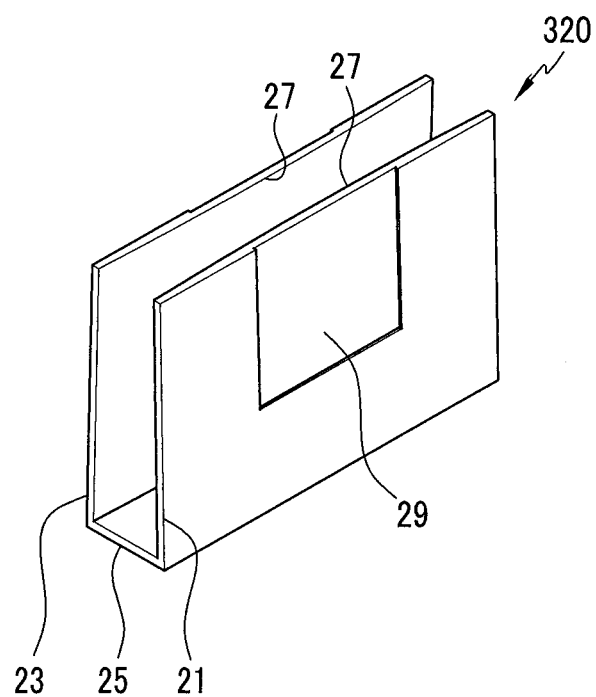
FIG. 10 is a schematic perspective view of a pressurization holder of a rechargeable battery according to a fourth exemplary embodiment of the present invention.

FIG. 10 is a schematic perspective view of a pressurization holder of a rechargeable battery according to a fourth exemplary embodiment of the present invention. The same reference numerals as those of FIGS. 1 to 9 denote the same members. Thus, a detailed description of the same reference numerals will be omitted hereinafter.

As shown in FIG. 10, a pressurization holder 320 of a rechargeable battery according to the fourth exemplary embodiment of the present invention does not have a reinforcing member (22 in FIG. 4) on the buffer recess 29. Thus, although the first and second side walls 21 and 23 may move due to expansion of the electrode assembly 10 caused as the rechargeable battery 100 is charged and discharged, a pressurization force is unlikely to be transferred to the case 40. That is, the first and second side walls 21 and 23 are deformed within the height of the buffer recess 29, not significantly transferring a pressurization force to the case 40 to cause deformation.

The exemplary embodiments of the present invention have been described with reference to the accompanying drawings.

However, the present invention is not limited thereto and various modifications other embodiments within the scope of the present invention can be made by a skilled person in the art. Thus, the true coverage of the present invention should be determined by the following claims.

| Description of Symbols | |
|---|---|
| 10. electrode assembly | 11. positive electrode |
| 11a. positive uncoated portion | 12. negative electrode |
| 12a. negative uncoated portion | 13. separator |
| 20. pressurization holder | 21. first side wall |
| 23. second side wall | 25. connector |
| 30. terminal | 31. cap plate |
| 32. positive terminal | 32a, 34a. flange |
| 32b. positive lead tab | 33. electrolyte injection hole |
| 34. negative terminal | 36. nut |
| 40. case | 41. opening |

What is claimed is:

1. A secondary battery comprising:
an electrode assembly;
a pressurization holder encompassing the electrode assembly, the pressurization holder comprising a plurality of side walls connected by a connector, each side wall having an exterior-facing surface and an interior-facing surface, wherein the exterior-facing surface has a buffer recess and a plurality of protrusions protruding from the buffer recess wherein the plurality of the protrusions protrude by less than a depth of the buffer recess; and
a case housing the electrode assembly and the pressurization holder.

2. The secondary battery of claim 1, wherein a portion of the side wall is rounded to protrude toward the electrode assembly.

3. The secondary battery of claim 2, wherein the portion is arc-shaped along at least one of a longitudinal direction or a lateral direction of the side wall.

4. The secondary battery of claim 1, wherein the pressurization holder is spaced from at least one of the case or the electrode assembly at the buffer recess.

5. The secondary battery of claim 1, wherein the buffer recess has a planar surface that is parallel to one of the interior-facing surface or the exterior-facing surface.

6. The secondary battery of claim 1, the exterior facing surface includes a reinforcing member comprising a plurality of ribs.

7. The secondary battery of claim 6, wherein the ribs are arranged to intersect each other.

8. The secondary battery of claim 1, wherein the connector is substantially perpendicular to each of opposing side walls.

9. The secondary battery of claim 1, wherein the connector is arc-shaped.

10. The secondary battery of claim 1, wherein the secondary battery further comprises a cap plate on the case and wherein the connector is located adjacent a bottom of the case substantially opposite to the cap plate.

11. The secondary battery of claim 1, wherein the pressurization holder comprises a generally elastic and flexible material.

12. The secondary battery of claim 1, wherein one of the exterior-facing surface and the interior facing surface is substantially smooth.

13. The secondary battery of claim 1, wherein the buffer recess generally corresponds to a center of the electrode assembly.

14. The secondary battery of claim 1, wherein the buffer recess extends to an edge of one of the side walls.

\* \* \* \* \*